United States Patent [19]

Kataoka et al.

[11] Patent Number: 5,983,212
[45] Date of Patent: Nov. 9, 1999

[54] DOCUMENT PROCESSING APPARATUS HAVING DISPLAY

[75] Inventors: Misao Kataoka, Mie-ken; Manami Yamada, Seto, both of Japan

[73] Assignee: Brother Kogyo Kabushiki Kaisha, Nagoya, Japan

[21] Appl. No.: 08/171,419

[22] Filed: Dec. 22, 1993

[30] Foreign Application Priority Data

Dec. 22, 1992 [JP] Japan ................................. 4-356888

[51] Int. Cl.$^6$ ........................................... G06F 17/30
[52] U.S. Cl. ................................... 707/1; 707/7
[58] Field of Search .................. 364/419.03, 419.15; 707/1, 6, 7, 10, 200

[56] References Cited

U.S. PATENT DOCUMENTS

| | | | |
|---|---|---|---|
| Re. 26,429 | 8/1968 | Kaufman et al. ............................ | 707/1 |
| Re. 26,919 | 6/1970 | Hagelbarger et al. ...................... | 707/6 |
| 3,242,470 | 3/1966 | Hagelbarger et al. ...................... | 707/1 |
| 3,302,186 | 1/1967 | Raser et al. ................................. | 707/1 |
| 3,350,695 | 10/1967 | Kaufman et al. ............................ | 707/2 |
| 4,355,370 | 10/1982 | Yanaguichi .................................. | 704/6 |
| 4,396,992 | 8/1983 | Hayashi et al. ..................... | 364/419.15 |
| 4,453,217 | 6/1984 | Boivie ......................................... | 707/5 |
| 4,459,049 | 7/1984 | Howell et al. .................. | 364/419.15 X |
| 4,651,299 | 3/1987 | Miyazaki et al. ......................... | 345/418 |
| 4,760,528 | 7/1988 | Levin .................................. | 364/419.15 |
| 4,777,596 | 10/1988 | Shaffer et al. ....................... | 364/419.15 |
| 4,969,097 | 11/1990 | Levin .................................. | 364/419.15 |
| 5,297,041 | 3/1994 | Kushler et al. ..................... | 364/419.15 |
| 5,303,361 | 4/1994 | Colwell et al. .............................. | 707/4 |
| 5,713,033 | 1/1998 | Sado ........................................ | 707/534 |

OTHER PUBLICATIONS

*Mastering Word Perfect® 5.1 & 5.2 for Windows*, Alan Simpson, Copyright 1993, SYBEX Inc., pp. 19–29.

"Turbo Pascal": reference guide from Borland International, 1800 Green Hills Road, P.O. Box 660001, Scotts Valley, Ca. 95066–001, front cover, title page, pp. 446–447, 1988.

*Primary Examiner*—Edward R. Cosimano
*Attorney, Agent, or Firm*—Oliff & Berridge, PLC

[57] ABSTRACT

In a document processing apparatus, upon selection of document-name registration in a main menu, a document-name register frame comprising a document-name input area and a document-name display area is displayed on a display. When a character key is manipulated to input the first character of the document name, a document-name search processing control is executed and a predetermined number of document names are successively displayed, from a document name having at least the same first character as the input document name, on the first and subsequent lines of the document-name display area.

18 Claims, 14 Drawing Sheets

Fig.3B

| ITEM | INSTRUCTIONS |
|---|---|
| S30 | CLEAR DOCUMENT-NAME BUFFER |
| S31 | PT ← TOP STORAGE ADDRESS |
| S32 | DISPLAY DOCUMENT-NAME REGISTER FRAME |
| S33 | READ OUT AND DISPLAY PREDETERMINED NUMBER OF DOCUMENT NAMES FROM DOCUMENT NAME INDICATED BY PT |
| S34 | KEY INPUT ? |
| S35 | CHARACTER KEY INPUT ? |
| S36 | INPUT CHARACTER ARRAY STORAGE/DISPLAY PROCESSING |
| S37 | BACK SPACE KEY INPUT ? |
| S38 | CHARACTER ERASING PROCESSING |
| S39 | CURSOR SHIFT KEY INPUT ? |
| S40 | CURSOR SHIFT/SCROLL PROCESSING |
| S41 | RETURN KEY INPUT ? |
| S42 | DOCUMENT-NAME REGISTER PROCESSING |
| S43 | CANCEL KEY INPUT ? |
| S44 | CANCEL PROCESSING |

DOCUMENT PROCESSING APPARATUS HAVING DISPLAY

BACKGROUND OF THE INVENTION

1. Field of the Invention

The invention relates to a document processing apparatus, and particularly to a document processing apparatus for displaying a registered document name in association with the name of a document to be input when the data of the document is stored on an electronic media.

2. Description of Related Art

Conventionally, there have been used a word processor for the Japanese language and a word processor for the English language which are equipped with various functions required for document input and editing, such as a basic character input function, a move and copy function, a word register function, a character modification function, and a table forming function. In these word processors, the data of a prepared document is stored into a text memory or on a floppy disk together with a document name thereof.

In the word processor for the English language for example, the names of a plurality of registered documents are stored in alphabetical order in a document-name memory. When document data is stored, a document-name register frame is displayed on a screen of a display, and a predetermined number of document names at the beginning of the plurality of document names stored in the document-name memory, which can be displayed on a part of the display, are listed on the screen to enable an user to refer to these document names which were previously stored. Accordingly, in order to store a document name, the user may display a portion of the stored document's names in association with the document name of the document to be input or stored. The registered document names can be scrolled upwardly or downwardly by manipulating cursor up/down shift keys to view all of the stored document names. From this, the operator can identify the document name suitable for the contents of the edited document or a document to be replaced, by referring to the registered document names. This avoids in incorrectly storing a document over a document having the same document name. Thus, the operator can store the document data into the text memory together with the correct document name.

As described above, in the word processor for the English language, when the document data is stored, desired registered document names which are referred to for the input of a document name are displayed while scrolling the screen by the manipulation of the cursor up/down shift keys. Accordingly, when the first letter of the document name to be stored is one of the final letters of the alphabet, such as "S" or "T", it takes a long time to display all of the stored document names to arrive at the document names starting with the designated letter. Thus, storing a document requires a long time, and the working efficiency for the document storage is lowered.

SUMMARY OF THE INVENTION

An object of the invention is to provide a document processing apparatus capable of improving the working efficiency for a document storing operation.

Another object of the invention is to provide a document processing apparatus capable of immediately displaying registered document names in association with a document name to be input when a document is stored with the document name.

To achieve the above objects, a document processing apparatus according to the invention includes:

input means for inputting data of characters; display means for displaying characters; a document data memory for storing input document data; a document-name memory for storing, in predetermined arrangement order, data of document names for the document data stored in the document data memory; document-name searching means for searching document names having the same first letter as an input document name in the document-name memory when at least the first letter of the input document name is input through the input means; and document-name read-out means for reading out the searched document-name data from the document-name memory and outputting the read-out document-name data to the display means.

In the document processing apparatus of the invention, when at least the first letter of a document name is input using the input means, the document-name searching means searches document names having the same first letter as the input document name in the document-name memory. In response to the output from the document-name searching means, the document-name read-out means reads out the searched document names and instructs the display means to display the searched document names.

According to the invention, in the registration of a document with a document name thereof, when at least the first letter of the document name is input, desired document names which have the same first letter as the input document: name are searched and immediately displayed without manipulating the cursor shift key. Therefore, the document registering operation is simplified and the working efficiency for the document register can be improved.

BRIEF DESCRIPTION OF THE DRAWINGS

A preferred embodiment according to the invention will be described hereunder with reference to the accompanying drawings, in which:

FIG. 3B is a table of labels for the steps of the flowchart of FIG. 3A;

DETAILED DESCRIPTION OF THE PREFERRED EMBODIMENTS

This embodiment relates to a case where the invention is applied to a word processor, for the English language, which is equipped with an electronic portable computing function.

Figure 1:
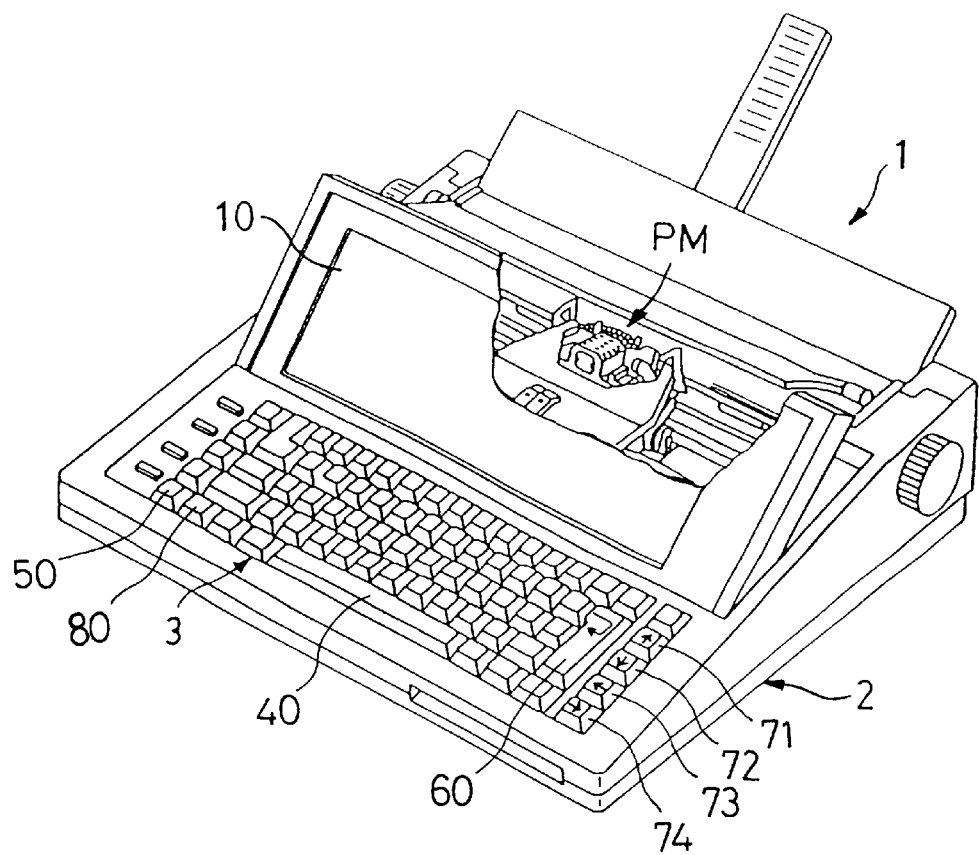
FIG. 1 is a perspective view of a word processor of an embodiment according to the invention.

As shown in FIG. 1, the word processor 1 includes a key board 3 which is disposed at the front side of a body frame 2 of the word processor 1, a character-wheel type of print mechanism PM which is disposed behind the key board 3 in the body frame 2, and a liquid crystal display 10 which is disposed at the rear portion of the key board 3 and capable of displaying characters and symbols over a plurality of lines.

The key board 3 includes character keys for inputting alphabetic characters, numerals and symbols, a space key 40, a back space key 50 for erasing a character just before a cursor K, a return key 60, four kinds of cursor shift keys 71, 72, 73, 74 for moving the cursor K in the up, down, left and right directions on the display 10, a cancel key 80 for ceasing the ongoing processing, and plural function keys required for document processing.

The print mechanism PM is of a general character-wheel type which includes a platen, a line feed motor for driving the platen, a carriage, a carriage motor for driving the carriage, a typewheel, and a typewheel motor for driving the typewheel as are known in the art. Therefore, a detailed description thereof is omitted hereunder. Further, although the invention is described in the context of an integrated word processor, having an impact printing element, it is applicable to any word processing system having an electronic storage capability.

Figure 2:
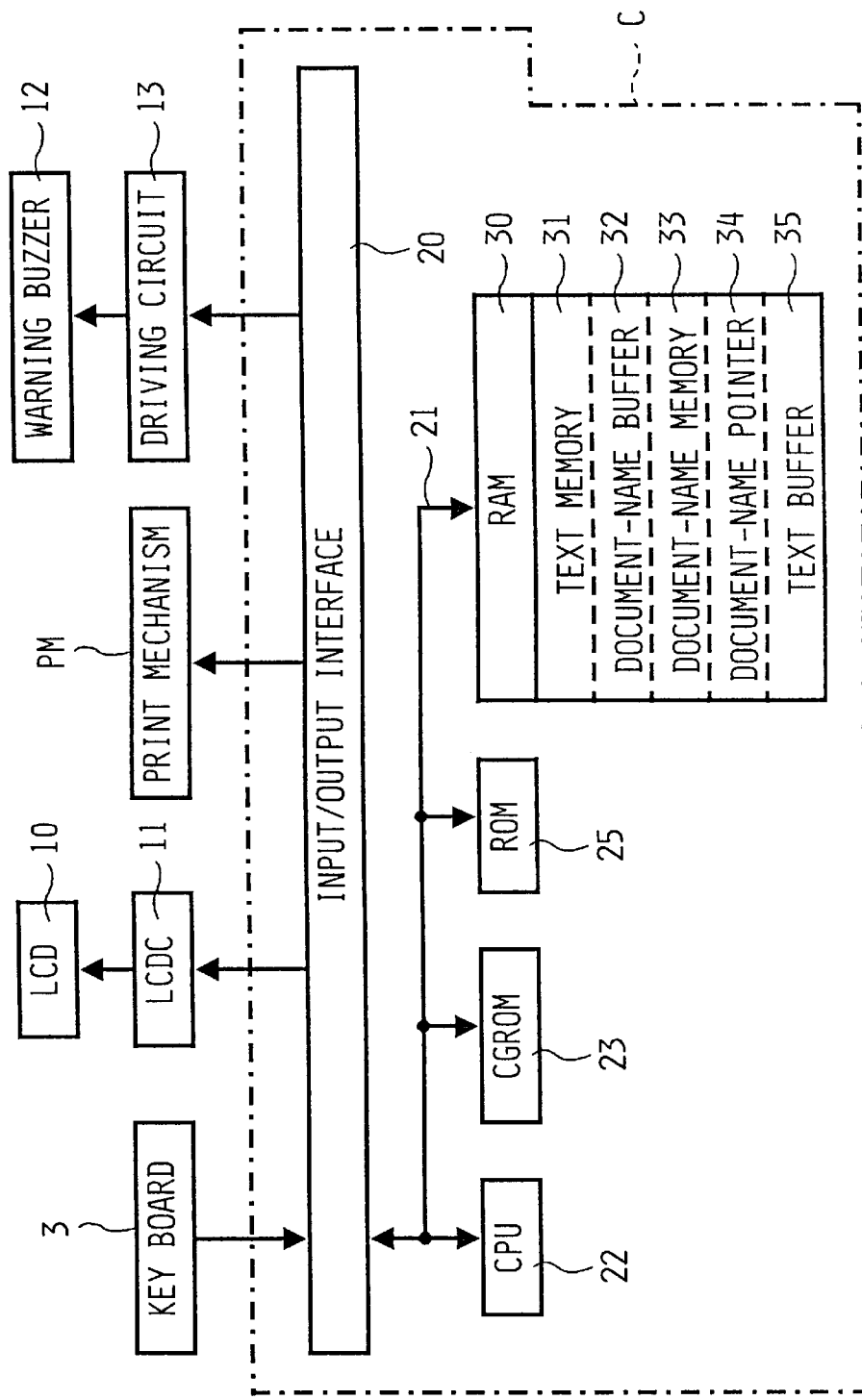
FIG. 2 is a block diagram showing a control system for the word processor.
Figure 3A:
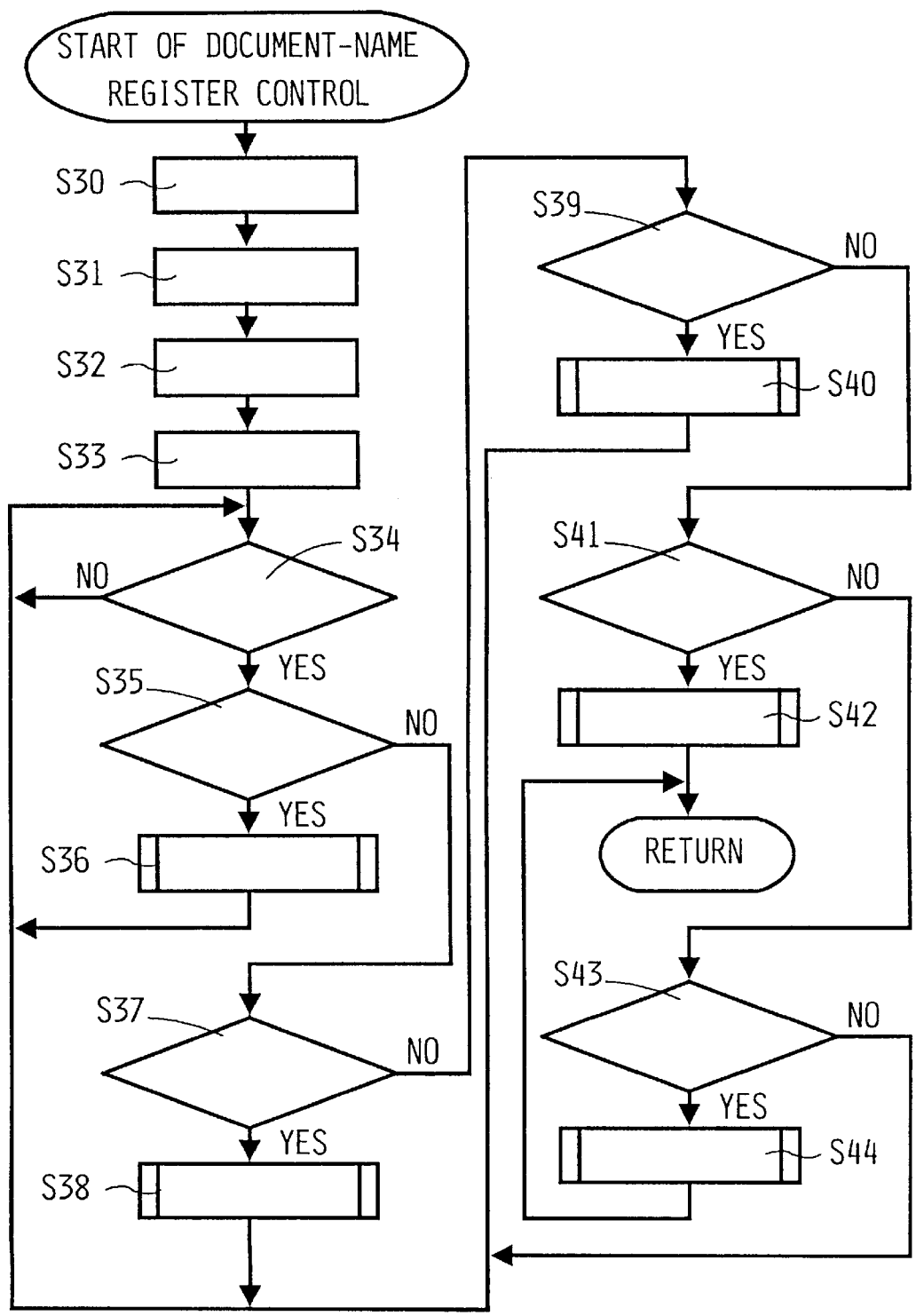
FIG. 3A is a flowchart showing a routine for document-name register control.

FIG. 2 is a block diagram showing the control system of the word processor 1.

As shown in FIG. 2, the key board 3, a display controller (LCDC) 11 having a display RAM for outputting display data to the liquid crystal display (LCD) 10, the print mechanism PM, and a driving circuit 13 for a warning buzzer 12 are connected to an input/output interface 20 of a control device C. The control device C comprises the input/output interface 20 and the components to which it is connected through a bus 21, a CPU 22, a CGROM 23, a ROM 25 and a RAM 30.

In the CGROM 23 are stored dot pattern data for display in correspondence with code data of many characters.

In the ROM 25 are stored a display driving control program for controlling the display controller 11 in correspondence with the code data of characters, such as letters, numerals, symbols, etc., which are stored in the text memory 31, a print driving control program for driving the typewheel motor and the carriage motor in correspondence with the code data of the text memory 31 when print processing is carried out, a control program for a document-name register control which is a main part of the invention and other necessary control programs as known in the art.

Figure 9:
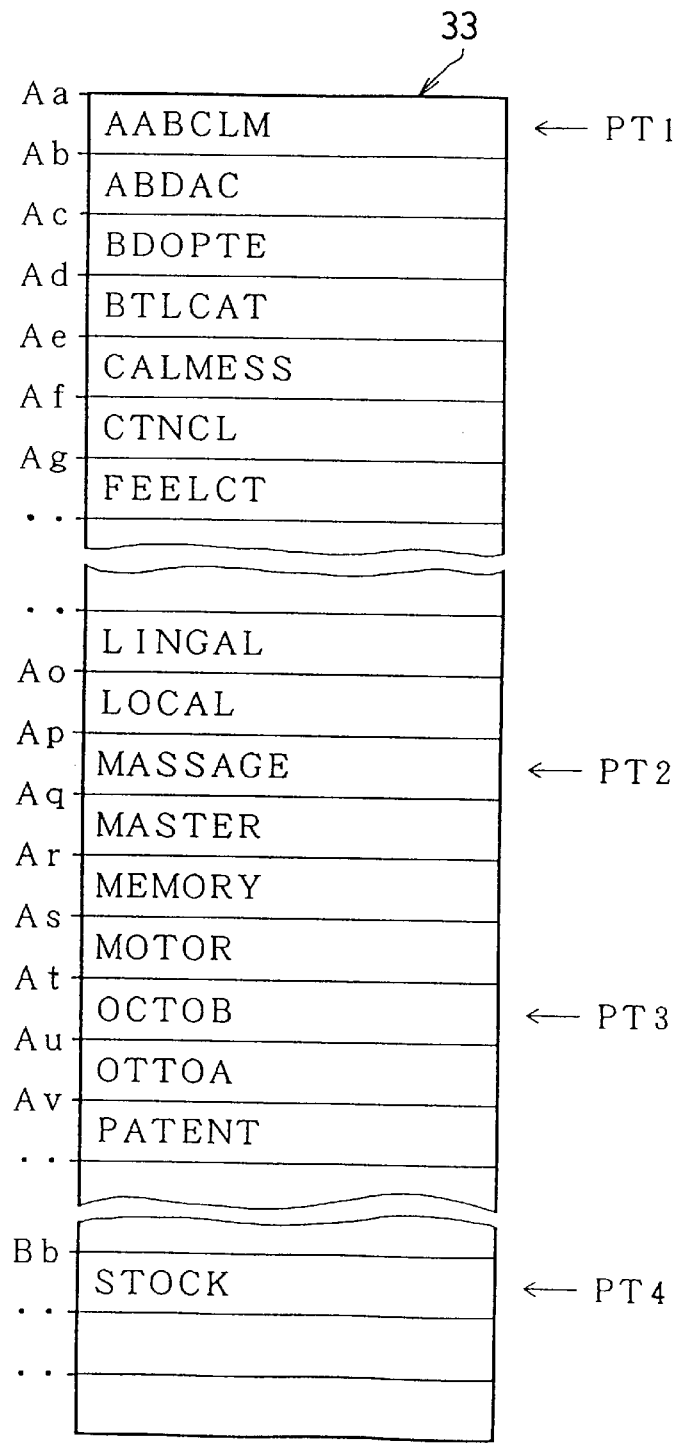
FIG. 9 is a schematic diagram showing the data structure in a document-name memory.
Figure 10:
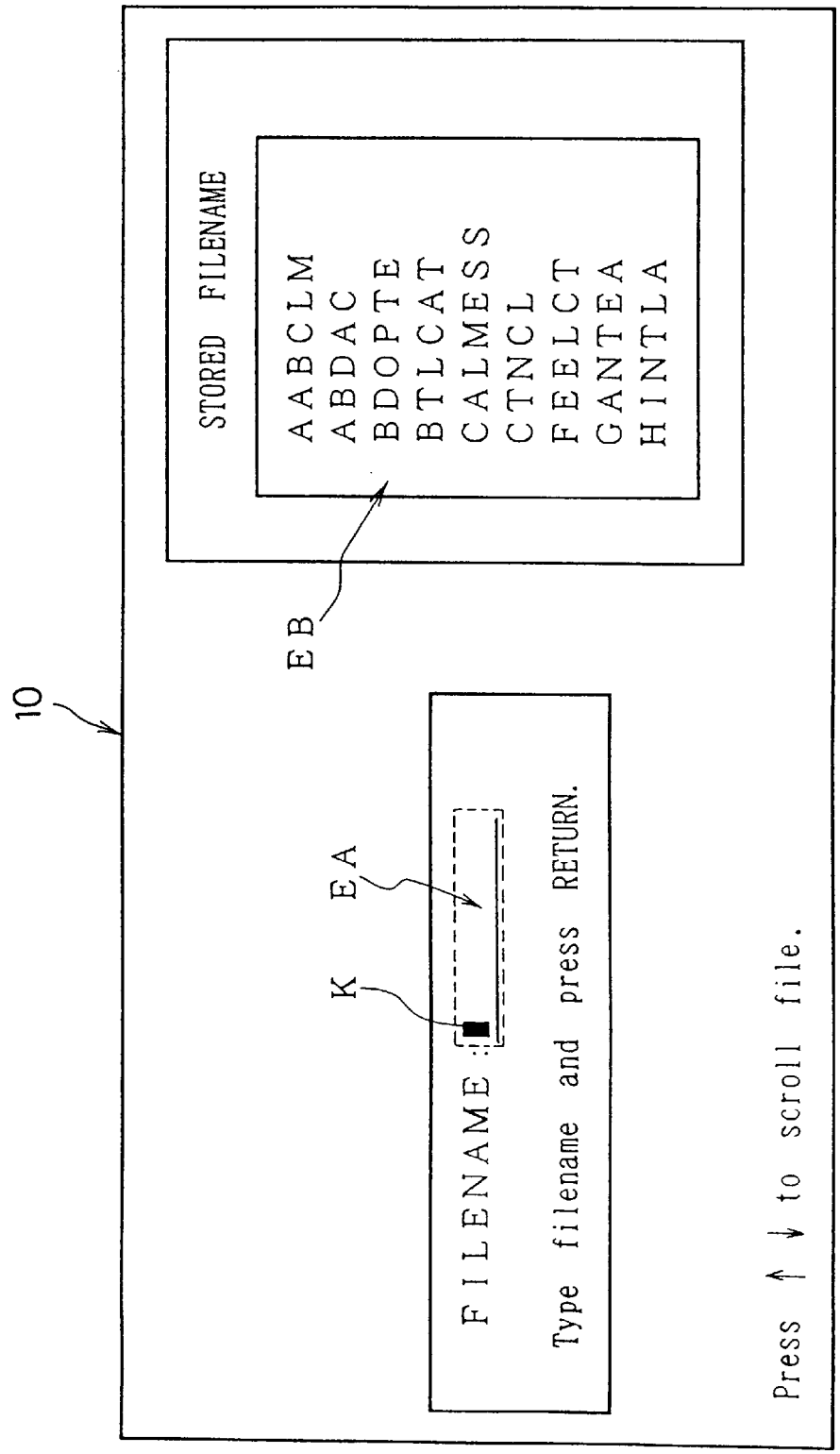
FIG. 10 is a schematic diagram showing a display example of plural document names on a document-name register frame containing a document-name input area.

The code data of the characters and symbols input from the key board 3 are stored as document data in the text memory 31 of the RAM 30. A document-name buffer 32 temporarily stores data of a document name which is input in association with a document being stored in the text memory 31. The data of a plurality of document names, each of which is stored in the document-name buffer 32, are stored in alphabetic order in the document-name memory 33. In a document-name pointer 34 are stored storage addresses ("As", "Ab", "Ac", . . . as shown in FIG. 9) for the document names stored in the document-name memory 33. This pointer value is represented by PT. Further, the RAM 30 is provided with a management memory for linking a storage position of each document name in the document-name memory 33 and a storage position of each document data in the text memory 31 to each other, a memory for temporarily storing a calculation result calculated in the CPU 22, and a memory for storing various other pointers, counters and flags. In the document-name buffer 32, a character array of input characters (eight characters at maximum) can be stored as a document name.

The alphabetic order in which the document-name data are stored in the document-name memory 33 will now be described. Continuous letter codes are allocated to plural alphabetic letters in such a manner that in ASCII code system, a letter "A": 41 (HEX), a letter "B": 42 (HEX), . . . for example. In this case, the following inequality is satisfied for the character codes:

$$A<B<C<D<E<F<\ldots<Y<Z.$$

The same inequality as for capital letters is satisfied for character codes of small letters "a", "b", "c", "d", . . . , "z". On the other hand, with respect to numerals, the following inequality is satisfied: $0<1<2<3<\ldots<8<9$. Further, the following inequality is satisfied between the alphabetic letters and the numerals: alphabetic letters < numerals, i.e., names starting with a letter are stored before names starting with a number. It is also possible to establish the inequality: numerals < alphabetic letters, i.e. names starting with a number are listed before those with a letter.

Next, the routine for the document-name register control executed in the control device C of the word processor 1 will be described with reference to flowcharts of FIGS. 3A, 3B, 4, 5, 6, 7 and 8. A reference character Si (i=30, 31, 32, . . . ) represents a step number.

The execution of the document-name register control is as follows.

Upon powering the word processor 1, a main menu containing a plurality of items such as "document preparation/editing", "document name register", "print format preparation", "print" . . . is displayed on the display 10. Thereafter, when the item "document preparation/editing" is selected and the keys for the document preparation such as the character keys, the numeral keys or the like are manipulated, the code data of the input characters, numerals, symbols, etc. are stored as document data in a text buffer 35. Subsequently, upon selection of the item "document name register", the document-name register control is started. When named, the data stored in the text buffer 35 will be stored in text memory 31 with its associated name stored in the document-name-memory 33.

Upon start of the document-name register control, the document-name buffer 32 is first cleared (S30), and the storage address of the document-name data at the head of the plural document-name data which are stored in the document-name memory 33 is set in the document-name pointer 34 having value PT (S31). For example, as shown in FIG. 9, many document-name data "AABCLM", "ABDAC", "BDOPTE" . . . "STOCK" are stored in correspondence with storage addresses "Aa", "Ab", "Ac", "Ad", . . . respectively in the document-name memory 33 and the head storage address "Aa" which is indicated by PT1 is set at the document-name pointer 34.

Subsequently, the document-name register frame is displayed on the display 10 (S32). Further, a predetermined number D of document-name data are selectively read out from the document-name data of the storage addresses indicated by the document-name pointer 34 in the document-name memory 33, and displayed on a part of the display 10 (S33). For example, a frame area containing a document-name input area EA, indicated by an underline, is used to register document names and is displayed at a left-hand half portion as shown in FIG. 10–13. Further, when the predetermined number D is nine, nine document names, for example, "AABCLM", "ABDAC", "BDOPTE", "BTLCAT", . . . , "HINTLA", are listed and displayed in a document-name display area EB at the right half portion of the document-name register frame (FIG. 10) based on the storage address indicated by the document-name pointer 34 value PT1, from the list of plural document names which have been already stored in the document-name memory 33.

When the character keys, such as the alphabetical letter keys and the numeral keys, are manipulated (S34, S35: Yes), the input character array storage/display processing control (see FIG. 4) is executed (S36). If the input character is a first letter (S50: Yes) on the basis of the data of the document-name buffer 32 (S51) when this control is started, the first character code α thereof is stored in the document-name buffer 32. In addition, the first character code α is displayed at a display position indicated by the cursor K on the display 10. When it is displayed, the cursor shifts to the right of K by one character (S52) and the document-name search processing commences (S53). Further, if there is no key input (S34), the control iteratively recycles unless a key input occurs.

Figure 4:
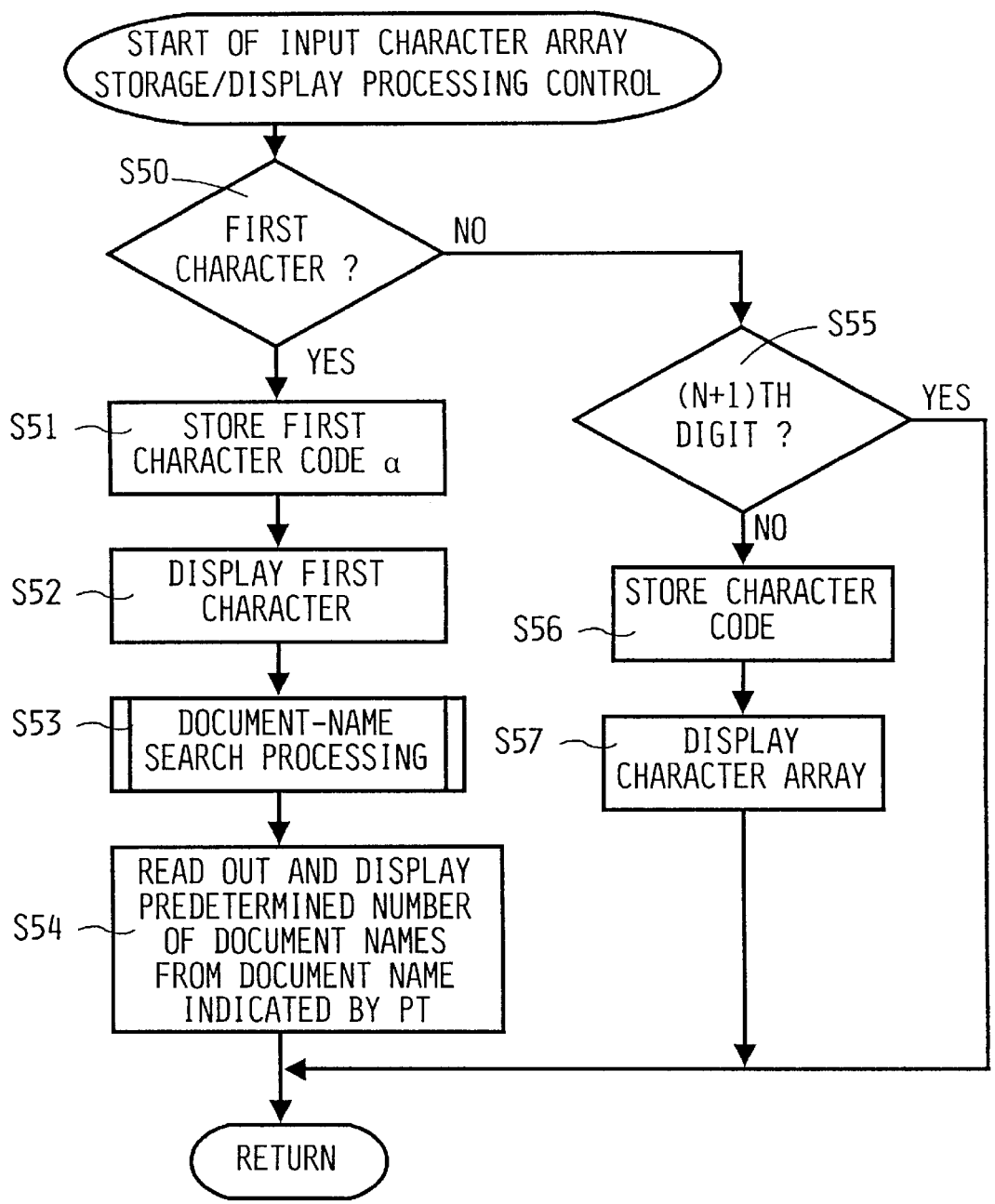
FIG. 4 is a flowchart showing a routine for input character array storage/display processing control.
Figure 5:
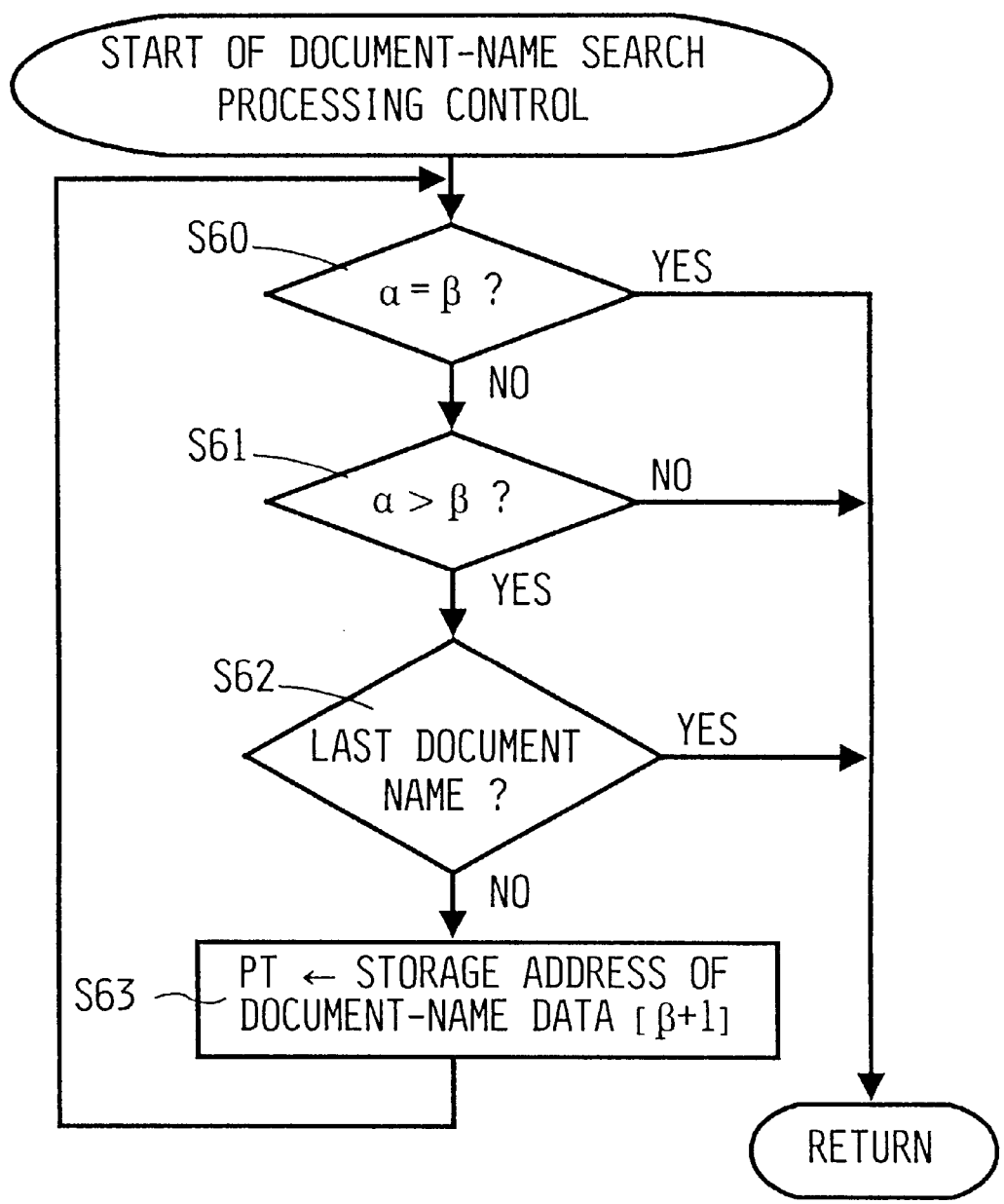
FIG. 5 is a flowchart showing a routine for document-name search processing control.
Figure 6:
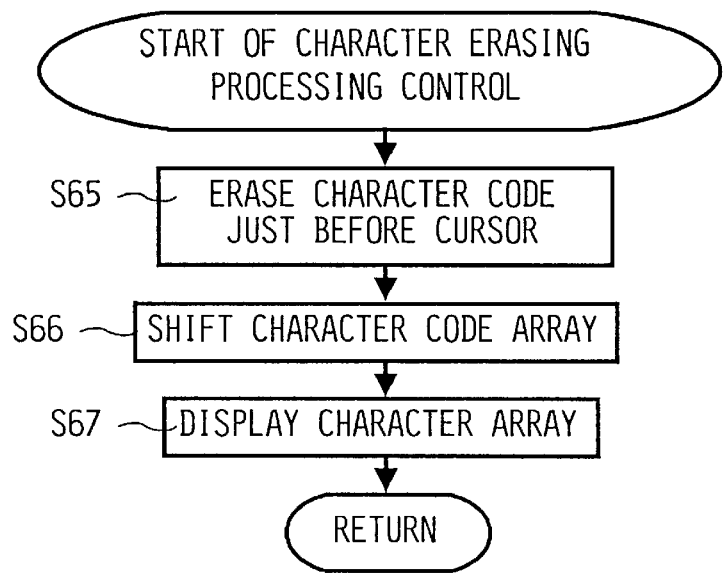
FIG. 6 is a flowchart showing a routine for document erasing processing control.
Figure 7:
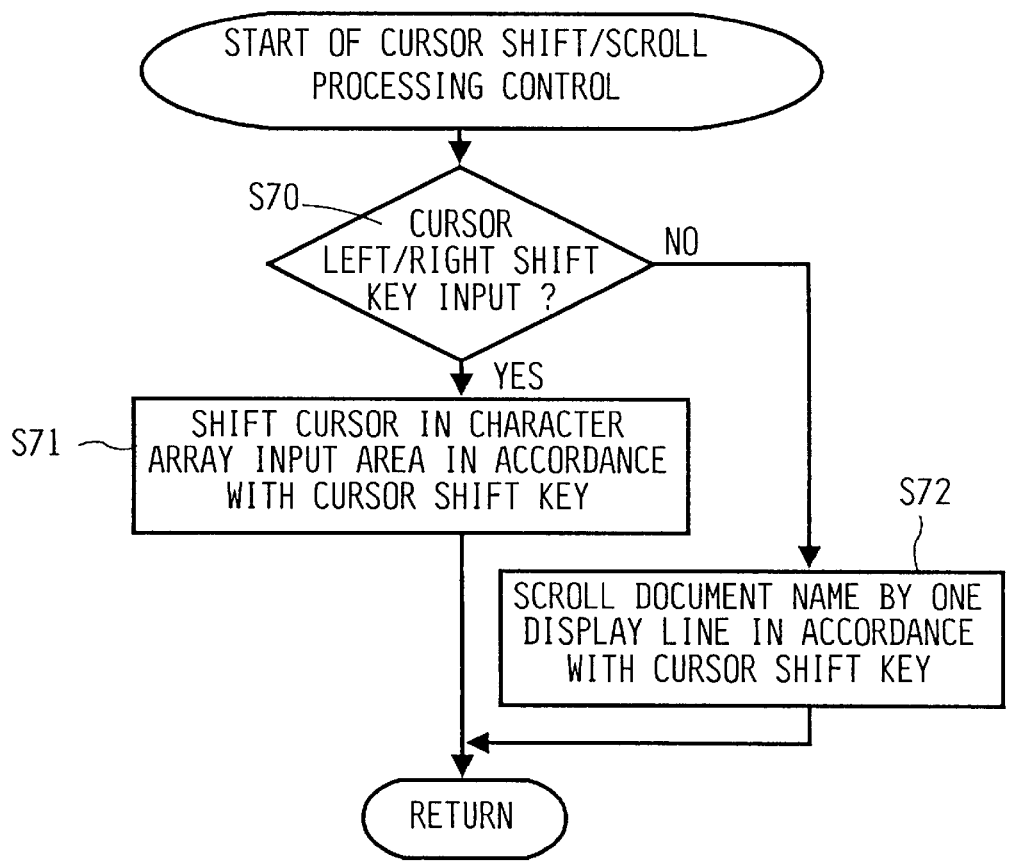
FIG. 7 is a flowchart showing a routine for cursor shift/scroll processing control.
Figure 8:
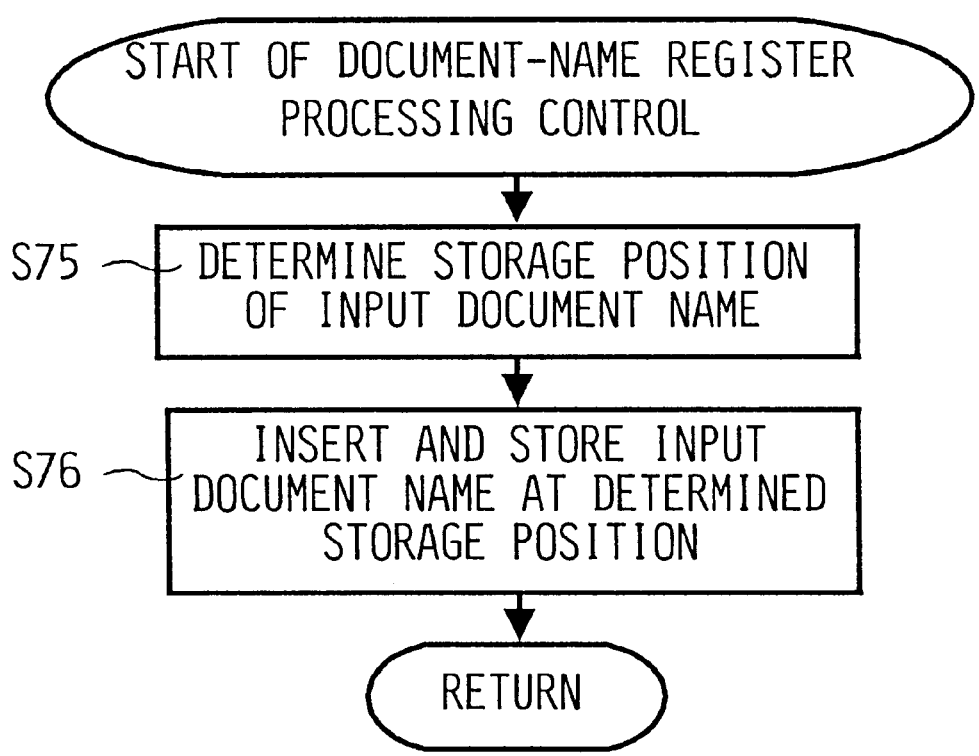
FIG. 8 is a flowchart showing a routine for document-name register processing control.

If the input first character code α is identical to a first character code β of a document-name data at a storage address indicated by the document-name pointer 34 when the control is started (FIG. 5, S60: Yes), the control is terminated, and the program returns to the step S54 of the storage/display processing control as shown in FIG. 4, so that the predetermined number of document-name data are read out from the document-name data at the storage address indicated by the document-name pointer 34. These stored document names are successively displayed from the first line of the document-name display area EB on the display 10.

On the other hand, if the first character code α is larger than the first character code β of the document-name data indicated by the document-name pointer 34 (S60: No, S61: Yes) and the document-name data having the first character code α is not the last document-name in the document-name memory 33 (S62: No), the storage address of a document-name data is incremented by "1" to set the document-name pointer 34 (S63), thereby designating the next document-name data having its first character code β, and the program returns to a step S60.

If the first character code α is smaller than the first character code β of the newly indicated document-name data as indicated by the document-name pointer 34 (S60, S61: No), control is again terminated, and the program returns to the step S54, so that a predetermined document-name data are read out from the document-name data as indicated by the document-name pointer 34, and the stored document names are successively displayed from the first line of the document-name display area EB. On the other hand, if the document-name data having the first character code β is the last document-name data in the document-name memory 33 (S60: No, S61, S62: Yes), control is also terminated, and the program returns to the step S54, so that the last stored document name is displayed on the first line of the document-name display area EB.

Figure 11:
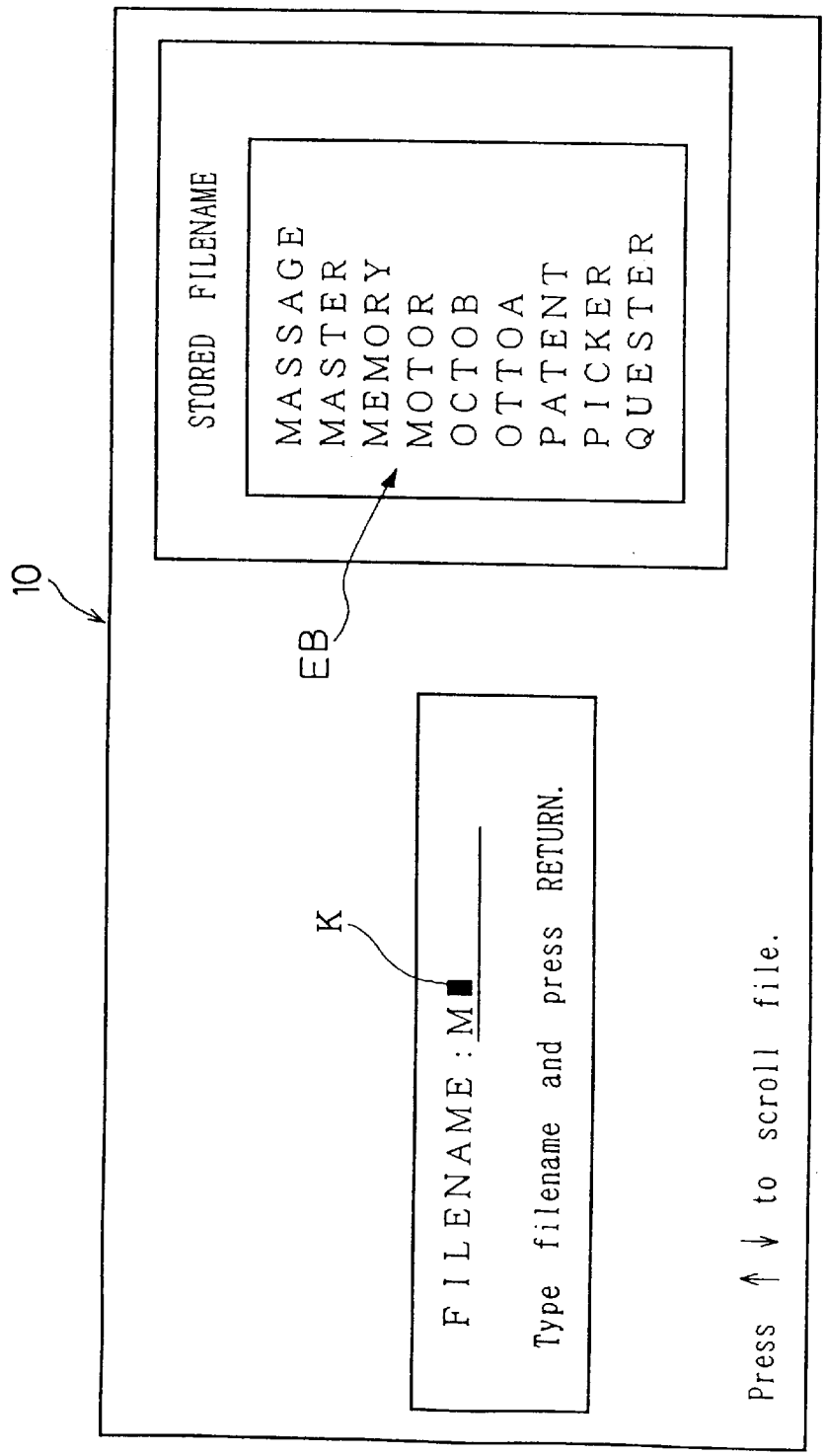
FIG. 11 is a schematic diagram showing a display example of registered document names having the same first letter "M" as a document name.

For example, as shown in FIG. 11, the input character code α is the character "M" and it is displayed at the document-name input area EA. As shown in FIG. 9, the document names having the first character "M" are successively searched in the document-name memory 33 while incrementing the document-name pointer 34. For a storage address "Ap" indicated by a value PT2 of the document-name pointer 34, the document-name "MASSAGE" having the same first character "M" is detected. Thus, as shown in FIG. 11, data of nine document names starting with the document name "MASSAGE" are read out from the document-name memory 33, and successively displayed from the first line of the document-name display area EB on the display 10.

Figure 12:
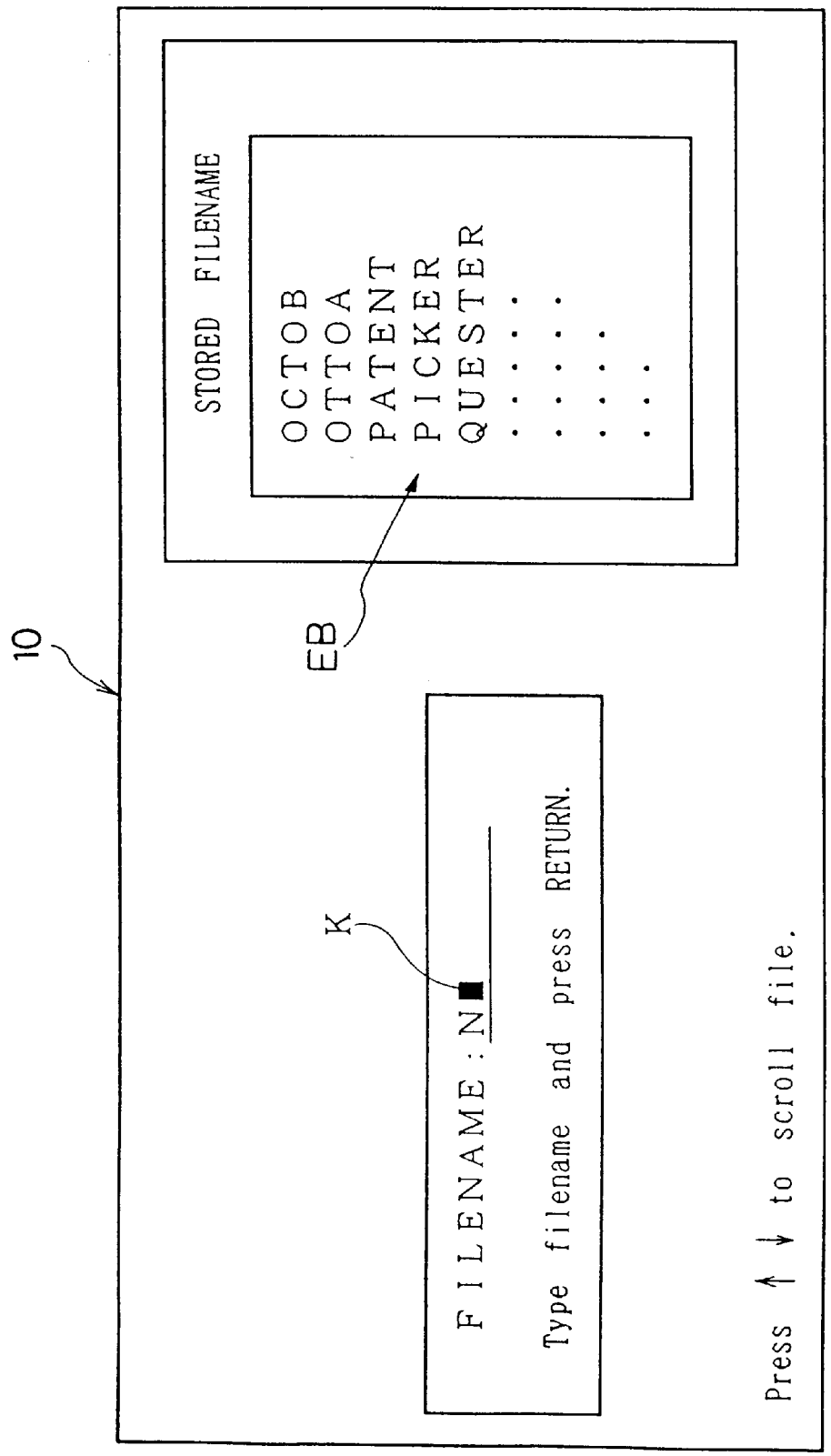
FIG. 12 is a corresponding diagram to FIG. 11 when there is no registered document name having the same first letter "N" as the document name.

For example, when the input character a is character "N", no document name having the same first character "N" exists in the document-name memory 33. Therefore, the storage address "At" indicated by PT3 is set to the document-name pointer 34, and, as shown in FIG. 12, stored document names commencing with the stored document name "OCTOB" which has a subsequent alphabetic letter, in this case the next letter "O", as a first character are displayed at the document-name display area.

Figure 13:
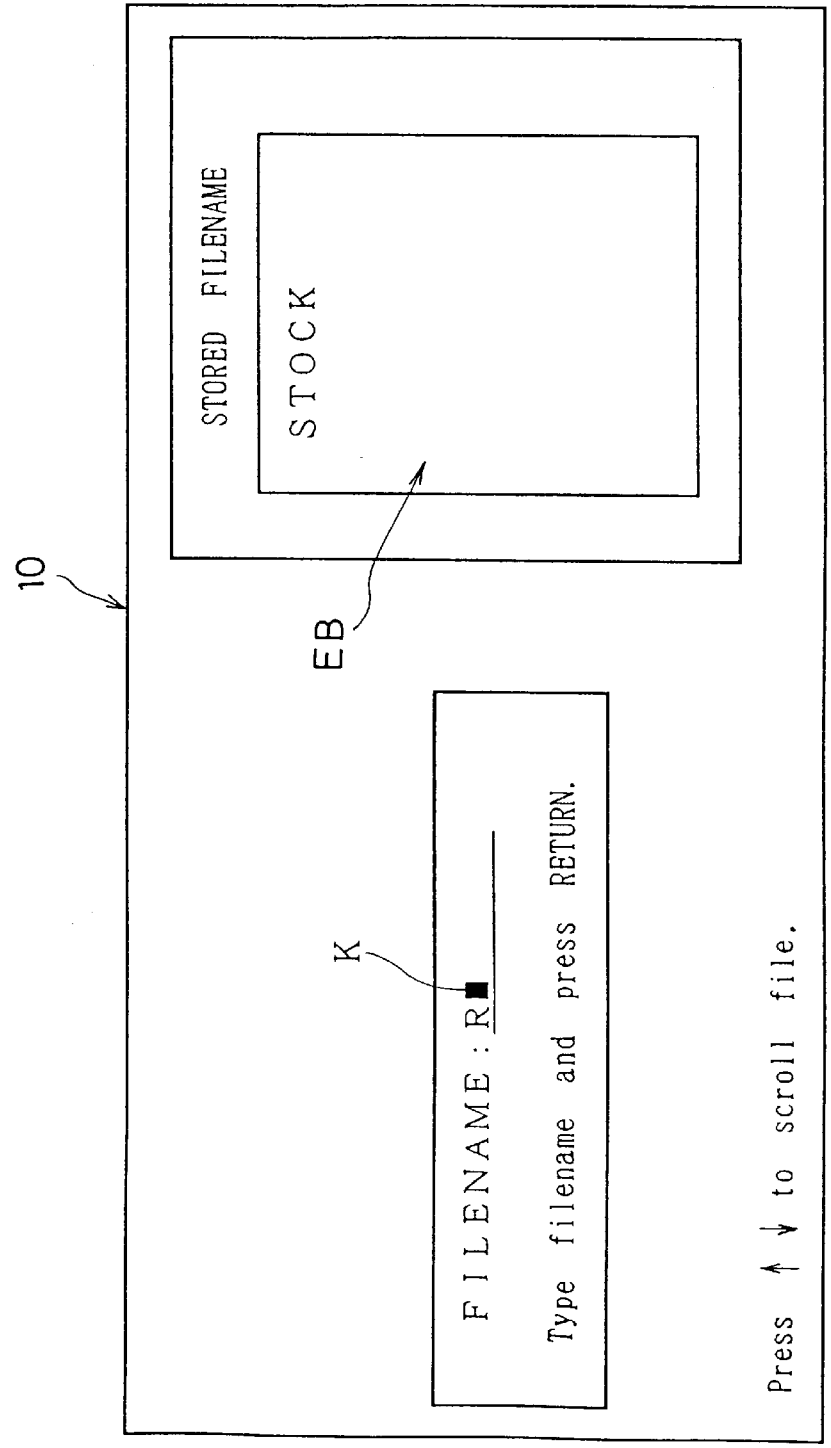
FIG. 13 is a corresponding diagram to FIG. 11 when there is no registered document name having the same first letter "R" as the document name.

In a further example, when the input first character is an "R" and there is no document name having the same first character "R" in the document-name memory 33, and the stored document name "STOCK", having the next alphabetic letter "S" as a first character, is the last document name in the document-name memory 33, a storage address "Bb" indicated by PT4 is set to the document-name pointer 34. Then, as shown in FIG. 13, the last registered document name "STOCK" is the only document name displayed on the first line of the document-name display area 10.

At the step S54, as described above, when the document names are displayed on the display 10, the input character array storage/display processing control is terminated, and the program returns to the step 34 of the document-name register control.

When the input character array storage/display processing control is started upon manipulation of the character keys (S34, S35: Yes), if the input character is not the first character and its position number is below a predetermined number N (S50, S55: No), the character code thereof is stored in the document-name buffer 32 (S56), and the character of the character code is displayed at the document-name input area EA as indicated by the cursor K (S57). In this embodiment, the predetermined number N is eight. Subsequently, the control is terminated, and the program returns to the step S34 of the document-name register control. On the other hand, when the character keys are manipulated (S34, S35: Yes) and the storage/display processing control is started, if the input character is not the first character and its position number is larger than the predetermined number N (S50: No, S55: Yes), the control is immediately terminated, and the program returns to the step S34.

Subsequently, when the back space key 50 is manipulated (S34: Yes, S35: No, S37: Yes), the character erasing processing control (see FIG. 6) is executed (S38).

Upon start of the control, the character code just before the cursor K is first erased from the document-name buffer 32 (S65), respective character codes subsequent to the erased character code are successively shifted to the top address side one by one and classified (S66), and then the character code in the document-name buffer 32 is displayed at the document-name input area EA (S67). Subsequently, this control is terminated, and the program returns to the step S34 of the document-name register control.

When one of the cursor shift keys 71, 72, 73, 74 are manipulated (S34: Yes, S35, S37: No, S39: Yes), the cursor shift/scroll processing control (see FIG. 7) is executed (S40).

When this control is started and the cursor left shift key 73 or cursor right shift key 74 is manipulated (S70: Yes), the cursor K is shifted to a display position that is one-character left or right, respectively of the starting position in the document-name input area EA in accordance with the cursor shift key 73 or 74 used and the new cursor position is displayed (S71). Subsequently, this control is terminated, and the program returns to the step S34 of the document-name register control.

When the cursor up-shift key 71 or cursor down-shift key 72 is manipulated (S70: No), the document names to be displayed at the document-name display area EB are scrolled upwardly or downwardly by one display line (S72). Subsequently, this control is terminated, and the program returns to the step S34.

When the return key 60 is manipulated (S34: Yes, S35, S37, S39: No, S41: Yes), the document-name register processing control (see FIG. 8) is executed (S42).

Upon start of this control, on the basis of the input document-name data stored in the document-name buffer 32 and plurality of document-name data stored in the document-name memory 33, the alphabetic storage position for the input document-name data being input into the document-name memory 33 is determined (S75) and the input document-name data is inserted into and stored at the determined storage position (S76). Subsequently, control is terminated and the program returns to the step S34 of the document-name register control.

When the cancel key 80 is manipulated (S34: Yes, S35, S37, S39, S41: No, S43: Yes), a cancel processing, such as clearing of the input document-name data is executed (S44), and the program returns to main processing prior to initiating document-name register control. On the other hand, if the cancel key 80 is not manipulated (S34: Yes; S35, S37, S39, S41, S41, S43: No), processing returns to step S34.

In the above embodiment, when the first character of an input document name is not the same as the first character of one of the document names already stored, the document names, commencing with the document names having the first character code B larger than the input first character code α that is encountered, are displayed from the first line of the document-name display area EB. In the case where the document name encountered is the last document-name data in the document-name memory 33, only that document name is displayed on the first line of the document-name display area EB.

Figure 14:
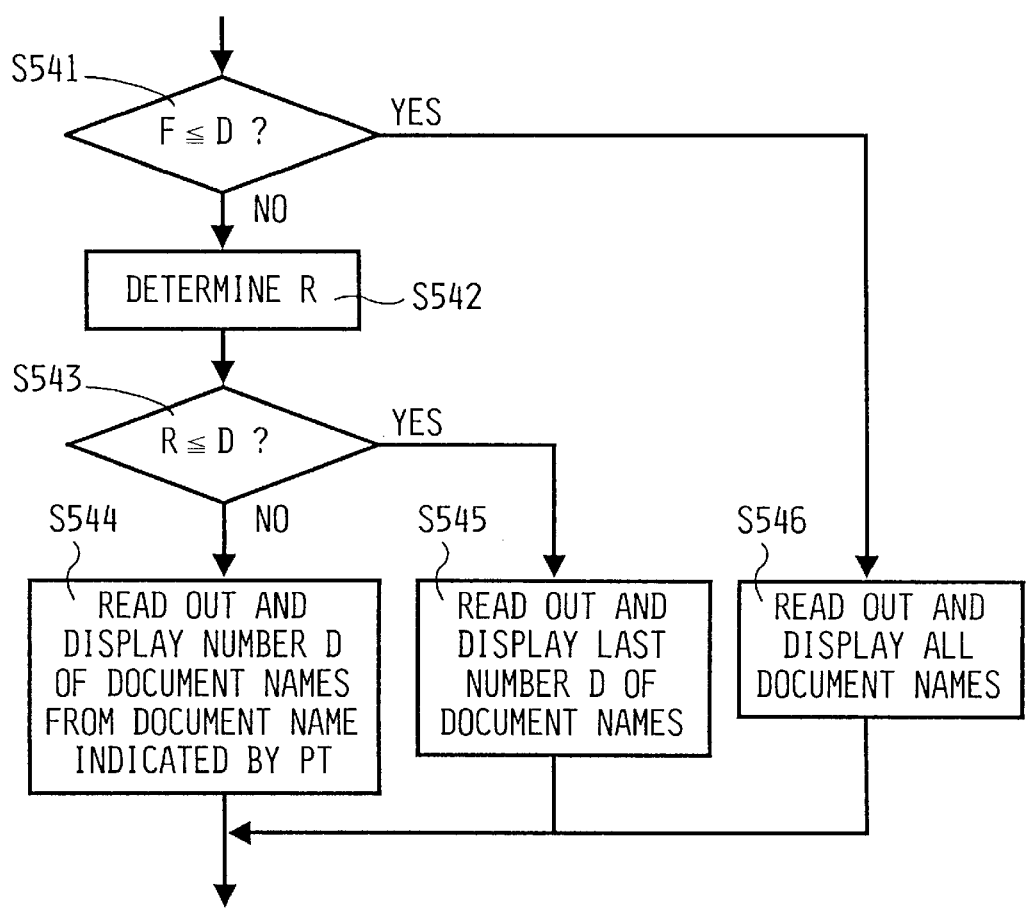
FIG. 14 is a flowchart showing a modification of the embodiment.

However, by replacing step S54 in FIG. 4 with steps S541 to S546 in FIG. 14, the document-name pointer 34 value PT may be set by an inverse operation on the basis of a displayable line number so that the last document name is displayed on the bottom line of the document-name display area EB. In such an embodiment, the stored document names are displayed at the document-name display area EB from the document-name data indicated by the document-name pointer 34 until the last document-name data stored in the document-name memory 33 is encountered or selected.

After a document name is searched in S53 of FIG. 4, as shown in FIG. 14, the number of already stored document names F is compared with a predetermined number D which represents the number of document names that can be displayed on the document-name display area EB (S541). In this embodiment, the predetermined number D is nine.

When the number of registered document names F is greater than the predetermined number D (S541: NO), the number of remaining document names R, which is the number of the document names from the document name indicated by the document-name pointer 34 to the last document name, is determined (S542). Then, the number of remaining document names R is compared with the predetermined number D (S543).

When the number of remaining document names R is greater than the predetermined document number D (S543: NO), the number D of document names from the document name indicated by document-name pointer 34 are read out from the document-name memory 33 and displayed on the document-name display area EB (S544). When the number of remaining document names R is smaller than or equal to the predetermined number D (S543: YES), the last number D of document names, that is a list of document names equal to the predetermined number D and finishing with the last document name, are read out from the document-name memory 33 and displayed on the document-name display area EB (S545). In this embodiment, then the last nine document names are displayed.

When the number of stored document names F is smaller than or equal to the predetermined number D (S541: YES), all document names are read out from document-name memory 33 and displayed on the document-name display area EB (S546).

As described above, in the storage of a document with its document name, when the first character of the input document name is input, potential stored document names having the same first character as the input document name are searched in the document-name memory 33 for the user's reference. The stored document names and stored document names subsequent to the document names are immediately displayed in a list form on a part of the display 10. Accordingly, manipulation of the cursor shift keys 71, 72, to scroll document names, is not required. Therefore, the document storage operation can be simplified and the working efficiency for document storage can be improved.

In the document-name search processing control, the steps S61 and S62 may be canceled, and the control may be so made that only stored document names having the same first character as the input document name are searched. Further, in the document-name search processing control, stored document names having several characters, rather than just the first character, at the beginning may be searched in the document-name memory 33.

Further, this invention is applicable to various kinds of document processing apparatuses such as a word processor for the Japanese language which is equipped with various document-name register functions and is so controlled that a document name is registered incidently to an input document. Here, in the word processor for the Japanese language, with respect to "Hiragana" and "Katakana", the following arrangement order is satisfied: "ア＜イ＜ウ＜エ＜オ＜カ＜ ... ＜ン", and with respect to "Kanji", the same arrangement order as "Hiragana" is satisfied for the Japanese rendering of "Kanji".

What is claimed is:

1. A document processing apparatus, comprising:

input means for inputting data of characters;

display means for displaying characters;

a document data memory for storing input document data;

a document-name memory for storing, in predetermined arrangement order, data of document names for the document data stored in the document data memory;

document-name searching means for searching document names having the same first character as an input document name for a newly input document to be stored, said input document name to be stored in the document-name memory, said document-name searching means commencing searching when at least the first character of the input document name is input through the input means;

document-name read-out means for reading out the searched document-name data on the basis of the first character of the input document name from the document-name memory and outputting the read out document-name data to the display means; and document storage means, wherein an operator, upon viewing the readout document-name data on the display means, enters additional characters up to a predetermined number of characters for naming the document, the first character and additional characters forming a name for the newly input document when entered, the name either the same as a displayed document-name so that the newly input document is stored in place of a previously input document in the document data memory or the name being a new name that is entered into the document-name memory and the newly input document is stored in the document data memory as a new document.

2. The document processing apparatus as claimed in claim 1, wherein the data of document names is stored in said document-name memory in alphanumeric order.

3. The document processing apparatus as claimed in claim 2, wherein data of document names starting with a letter are stored before data of document names starting with a number.

4. The document processing apparatus as claimed in claim 2, wherein data of document names starting with a number are stored before data of document names starting with a letter.

5. The document processing apparatus as claimed in claim 1, further comprising:

document-name registering mode selecting means for selecting a document-name registering mode.

6. The document processing apparatus as claimed in claim 5, wherein said display means has two sections when in the document-name registering mode, a first section for displaying characters input as a document name and a second section for displaying searched document names.

7. The document processing apparatus as claimed in claim 6, wherein the display means in said second section displays at most a predetermined number of document names.

8. The document processing apparatus as claimed in claim 7, wherein said document-name read-out means includes first determining means for determining whether a total number of document names in said document-name memory is greater than the predetermined number of document names, and wherein when determination of said first determining means is negative, said document-name read-out means outputs all document names in said document-name memory for display in said second section of said display means.

9. The document processing apparatus as claimed in claim 7, wherein when said document-name searching means identifies a document name having the same first character as the input document name, said document-name read-out means outputs at most the predetermined number of document names starting with the identified document name for display in said second section of said display means.

10. The document processing apparatus as claimed in claim 7, wherein when said document-name searching means does not identify a document name having the same first character as the input document name, said document-name searching means identifies the next document name in alphanumeric sequence based upon the first character and said document-name read-out means outputs at most the predetermined number of document names starting with the identified next document name for display in said second section of said display means.

11. The document processing apparatus as claimed in claim 9, wherein said document-name read-out means includes first determining means for determining whether a total number of document names in said document-name memory is greater than the predetermined number of document names and second determining means for determining whether a number of document names in said document-name memory counted from the identified document name to the last document name is less than the predetermined number of document names, and wherein when determinations of both said first determining means and said second determining means are affirmative, said document-name read-out means outputs the predetermined number of document names found at an end of a list of the document names stored in said document-name memory for display in said second section of said display means.

12. The document processing apparatus as claimed in claim 10, wherein said document-name read-out means includes first determining means for determining whether a total number of document names in said document-name memory is greater than the predetermined number of document names and second determining means for determining whether a number of document names in said document-name memory counted from the identified document name to the last document name is less than the predetermined number of document names, and wherein when determinations of both said first determining means and said second determining means are affirmative, said document-name read-out means outputs the predetermined number of document names found at an end of a list of the document names stored in said document-name memory for display in said second section of said display means.

13. A document processing method, comprising the steps of:

storing input documents in a text memory;

storing names for input documents in a predetermined alphanumeric order, each stored name associated with a stored document;

preparing a new document by storing in a temporary memory prior to storing in the text memory;

selecting a text naming routine;

inputting at least a first character for a text name;

displaying the input first character in a first area of a display;

searching the document name memory for document names having a first character the same as the input first character;

displaying at most a predetermined number of document names in a second area of the display, wherein the displayed names commence with a first identified document name having one of the first character the same as the input first character and a subsequent first character letter in the alphanumeric order first encountered when a document name having the same first character is not found in the document name memory;

inputting additional characters up to a predetermined number of characters, the additional characters combining with the input first character to form a name corresponding to one of the document names displayed in the second area of the display or a new document name; and entering the name, wherein entering the name causes the new document to replace an existing document when the name corresponds to one of the displayed document names and causes the name to be entered into the document name memory and the new document to be stored in the text memory when the name differs from the displayed document names.

14. The method as claimed in claim 13, further comprising the steps of:

determining none of the displayed names are appropriate names for the prepared document;

inputting an additional number of characters up to a predetermined number; and designating the input characters as a name for the prepared document.

15. The method as claimed in claim 14, further comprising the steps of:

identifying a position in the alphanumerically ordered names in the document name memory for the designated name; and inserting the designated name in the identified position.

16. A document naming apparatus, comprising:

means for storing input documents in a text memory;

means for storing names for input documents in a predetermined alphanumeric order in a document name memory, each stored name associated with a stored document;

means for preparing a new document by storing in a temporary memory prior to storing in the text memory;

means for selecting a text naming routine;

means for inputting at least a first character for a text name;

means for displaying the input first character in a first area of a display;

means for searching the document name memory for document names having a first character the same as the input first character;

means for displaying at most a predetermined number of document names in a second area of the display, wherein the displayed names commence with a first identified document name having one of the first character the same as the input first character and a subsequent first character letter in the alphanumeric order first encountered when a document name having the same first character is not found in the document name memory;

means for inputting additional characters up to a predetermined number of characters, the additional characters combining with the input first character to form a name corresponding to one of the document names displayed in the second area of the display or a new document name; and means for entering the name, wherein entering the name causes the new document to replace an existing document when the name corresponds to one of the displayed document names and causes the name to be entered into the document name memory and the new document to be stored in the text memory when the name differs from the displayed document names.

17. The apparatus as claimed in claim 16, further comprising:

means for inputting an additional number of characters up to a predetermined number; and means for designating the input characters as a name for the prepared document.

18. The apparatus as claimed in claim 17, further comprising:

means for identifying a position in the alphanumerically ordered names in the document name memory for the designated name; and means for inserting the designated name in the identified position.

* * * * *